United States Patent
Tolle et al.

(10) Patent No.: US 7,522,176 B2
(45) Date of Patent: Apr. 21, 2009

(54) DYNAMICALLY GENERATING MINI-GRAPHS TO REPRESENT STYLE AND TEMPLATE ICONS

(75) Inventors: Kristin M. Tolle, Redmond, WA (US); Andrew J. Verprauskus, Clyde Hill, WA (US); Benjamin E. Rampson, Redmond, WA (US); Anupam Garg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 380 days.

(21) Appl. No.: 11/600,000

(22) Filed: Nov. 14, 2006

(65) Prior Publication Data

US 2008/0115049 A1   May 15, 2008

(51) Int. Cl.
*G06F 17/00* (2006.01)
*G06F 3/048* (2006.01)
*G09G 5/00* (2006.01)
*G06K 9/64* (2006.01)
*G06T 11/20* (2006.01)

(52) U.S. Cl. ............... 345/619; 345/440; 345/440.2; 345/660; 382/217; 382/305; 715/209; 715/249; 715/252; 715/835

(58) Field of Classification Search ........... 345/581, 345/619, 649, 660, 440, 440.2, 472, 156, 345/520; 382/217, 282, 305; 715/200, 209, 715/248–249, 252, 700, 763–765, 781, 825, 715/835–837, 856

See application file for complete search history.

(56) References Cited

U.S. PATENT DOCUMENTS

| | | | | |
|---|---|---|---|---|
| 5,581,677 | A | 12/1996 | Myers et al. | 395/140 |
| 5,581,678 | A | 12/1996 | Kahn | 395/140 |
| 5,619,631 | A | 4/1997 | Schott | 395/140 |
| 5,666,477 | A | 9/1997 | Maeda | 345/440 |

(Continued)

OTHER PUBLICATIONS

Grapher, http://www.goldensoftware.com/products/grapher/grapher.shtml, (last accessed Oct. 26, 2006) 16 pgs.

(Continued)

*Primary Examiner*—Wesner Sajous
(74) *Attorney, Agent, or Firm*—Merchant & Gould, P.C.

(57) ABSTRACT

Various technologies and techniques are described that enhance ease of selection of chart styles using dynamically generated icons to represent style and templates. As one non-limiting example, a gallery view of available chart styles for a currently selected theme is generated using the same rendering engine that processes data to create graphs. A sample chart is generated of the same type as a graph in an active document. Sample data is retrieved for the selected chart type. The currently selected theme is applied to the sample chart, and the sample chart is formatted for a small form factor. Each available style in the currently selected theme can be applied to the sample chart, which is now formatted for an iconic sized graphical representation, to generate mini-graph representations of each style. The styles can be presented to the user as a gallery view for user selection of a chart style.

20 Claims, 6 Drawing Sheets

U.S. PATENT DOCUMENTS

| | | | |
|---|---|---|---|
| 6,088,030 A | 7/2000 | Bertram et al. | 345/349 |
| 6,144,379 A | 11/2000 | Bertram et al. | 345/348 |
| 6,906,717 B2 | 6/2005 | Couckuyt et al. | 345/440 |
| 7,084,872 B2 | 8/2006 | Etgen et al. | 345/440 |
| 2003/0154443 A1 | 8/2003 | Papierniak et al. | 715/502 |
| 2006/0136819 A1* | 6/2006 | Tolle et al. | 715/523 |
| 2007/0126736 A1* | 6/2007 | Tolle et al. | 345/440 |

OTHER PUBLICATIONS

The Graph: Types, http://www.originlab.com/pdfs/slick_origin75_features_list.pdf, © 2003 (last accessed Oct. 26, 2006) 1 pg.

SigmaPlot Quickly create the Graph you need, http://www.systat.com/products/SigmaPlot/, © 2002 (last accessed Oct. 26, 2006) 4 pgs.

\* cited by examiner

DYNAMICALLY GENERATING MINI-GRAPHS TO REPRESENT STYLE AND TEMPLATE ICONS

BACKGROUND

Various application programs are available that allow users to generate graphical charts that represent data. Example application programs that include such facility include spreadsheet programs, word processing programs, and presentation programs. The graphical chart representations of the data can take on a variety of forms such as a linear graph, a bar graph, a polar graph, a pie chart, a scatter plot, as well as other varieties of graphical representations that can be 2-dimernsional (2D) or 3-dimensional (3D). Such graphical representation can make the data easier to visualize and understand for any number of purposes.

A formatting tool is typically employed by a user to select the graphical representation for the selected data. In order to format a chart, a user typically selects individual elements and data series to format, and then selects a graphical format for representing the data as a particular chart type. Each represented element and data series can have a different user selected graphical representation according to color, legend marker, line style, fill style or other graphical indicia. The formatting tool typically can allow the user to select any number of pre-defined chart types by a user input mechanism such as selection from a menu (pull-up, pull-down, pop-up, etc.) or selection from a gallery, where each chart-type is represented by a small icon that provides a visual indication of the chart type.

Once the formatting for a particular chart is completed, some formatting tools permit storing of the user defined format for the current chart. Multiple chart types can be defined and collected in a common library so that users can access and utilize a standardized set of chart types with common graphical themes. Some environments also permit the user-defined chart types to be stored in a text file that can be accessed by pull-down menus, or as a gallery file that includes a static iconic representation of a chart-type.

SUMMARY

Described herein are various technologies and techniques that enhance ease of selection of chart styles using dynamically generated icons to represent style and templates. As one non-limiting example, a gallery view of available chart styles for a currently selected theme is generated using the same rendering engine that processes data to create graphs. Any number of sample charts can be generated of the same type as a graph in an active document. Sample data is retrieved for the selected chart type. The currently selected theme is applied to the sample chart, and the sample chart is formatted for a small form factor. Each available style in the currently selected theme can be applied to the sample chart, which is now formatted for an iconic sized graphical representation, to generate mini-graph representations of each style. The styles can be presented to the user as a gallery view for user selection of a chart style.

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
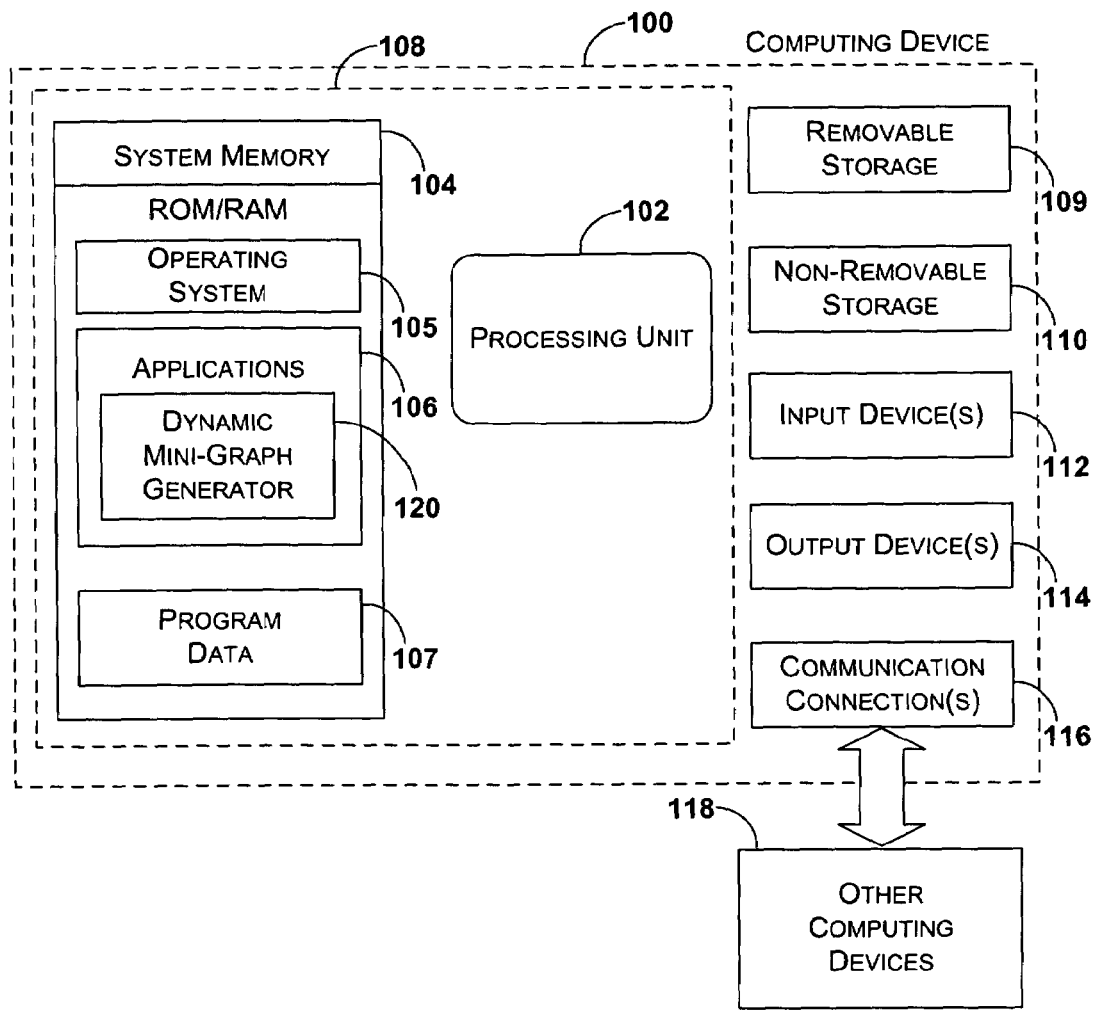
FIG. 1 illustrates an example computing device that may be used in accordance with at least some aspects of the present disclosure.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments described herein are referred to alternatively as operations, steps or modules.

Data used for generating a graphical chart (sometimes referred to herein simply as "a graph" or "a chart") can be presented to an application program in the form of a document that includes associated parameters such as themes, layouts, and styles. These parameters (e.g., style, theme, layout, etc.) associated with the document can be stored as data, meta-data, or as part of an XML structure. The appearance of the graphical chart is affected by the selected theme so that all documents that have the same theme appear to have a unified graphical appearance. Each theme includes a defined set of graphical elements that help create a distinctive appearance, including graphical element definitions such as backgrounds, fonts, colors, fill-patterns and other graphical elements. Themes can be either predefined or customized according to user preferences. Within a given theme, there are multiple styles available to the user. Although all styles within a theme typically have a look that is similar to other styles within the theme (preserving a unified appearance when desired), each style represents adjustments to create a distinctive appearance.

A graphical representation of data for the active document by rendering the chart data based on the selected chart type. Example chart types include column charts, bar graphs, line charts, pie charts, XY or scatter charts, area charts, surface charts, 2D charts, 3D charts, as well as many others. The chart type has a base set of features that are applied to create a uniform look including the general layout of the graphical representation. Themes and styles can also be applied to the chart based on any variety of preconfigured or user generated themes and styles.

Iconic representations of the graphs can be used to aid the user in choosing between chart types. In accordance with the present disclosure, the user can select grouped stylistic and element options for a given chart using a formatting tool, where the formatting tool provides a highly realistic iconic visual representations of what the chart will look like before selection of the style.

The present disclosure recognizes that it is infeasible to enumerate all possible visual representations of chart styles, chart types, and chart templates. This is especially true since there are a very large set of possible stylistic representations within a given theme. Since users can also have the ability to customize styles, create new styles and layouts, and create customized charts, there is an unpredictable number of possibilities of visual representations.

A feasible and extensible method and system for dynamically generating icons is presented herein, where each visual iconic representation can be generated as needed from within the application environment. Each icon is a mini-graph is a graphical representation of the visual appearance for a given style in the current theme. In one example, each mini-graph is made up of a subset of chart elements to create a coherent graph that is 64 pixels wide by 48 pixels high. The icons present sufficient information to enable users to make an informed choice. The iconic representations are extensible to any number of combinations including layout, chart type, chart styles, document themes, etc. The set of characteristics of the mini-graph that enable users to be able to see the specifics they need while still maintaining the coherence of the chart that is produced so that users can see what they are getting prior to selection.

FIG. 1 illustrates an example system for implementing the invention that includes a computing device, such as computing device 100. In a basic configuration, computing device 100 may include a stationary computing device or a mobile computing device. Computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for dynamically generating mini-graphs. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included.

Computing device 100 also contains communication connection(s) 116 that allow the device to communicate with other computing devices 118, such as over a network or a wireless network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Figure 2A:
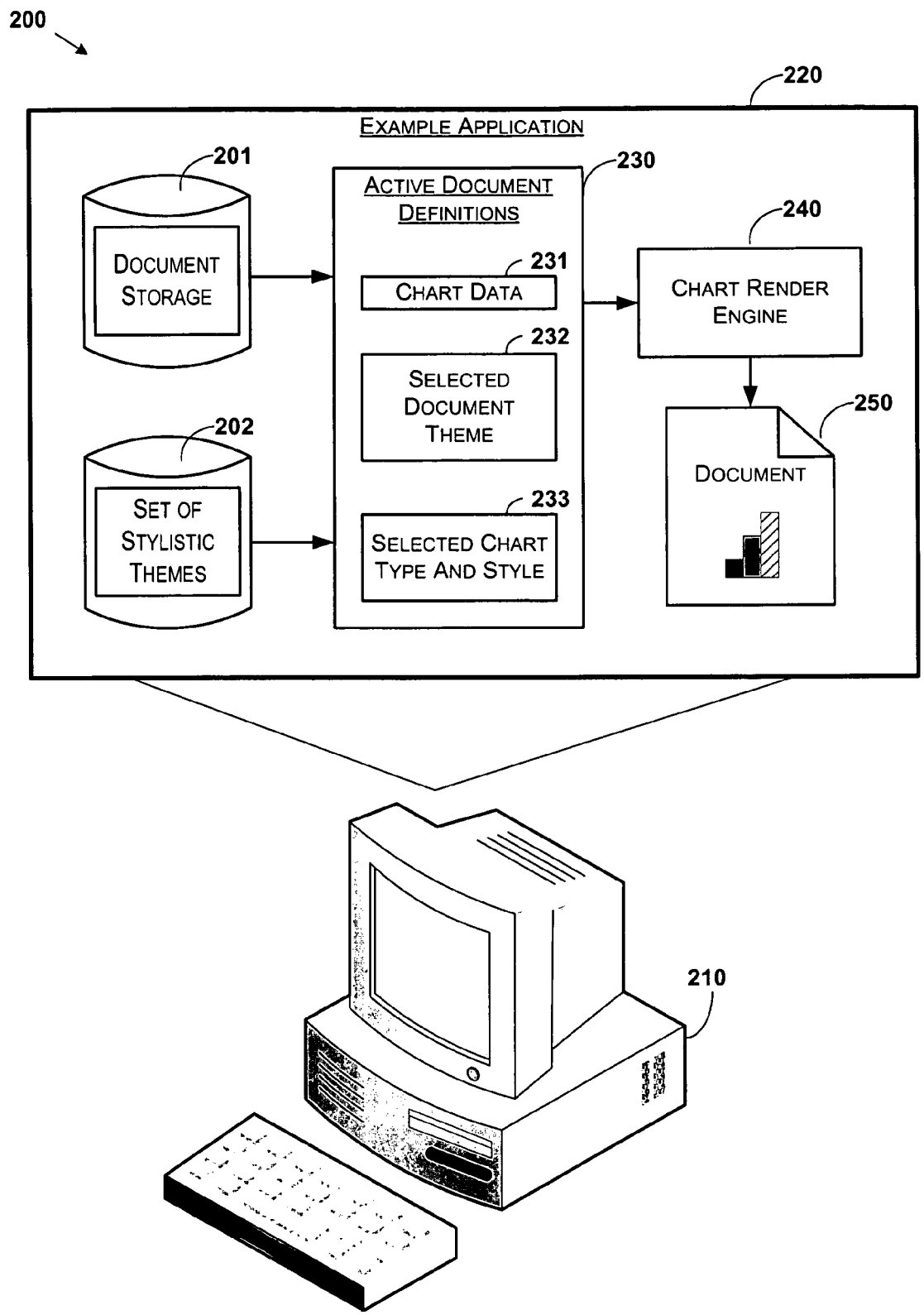
FIGS. 2A and 2B illustrate an example system overview for facilitating graphical rendering of charts and mini-graphs using a common render engine in an application program according to at least some aspects of the present disclosure.
Figure 2B:
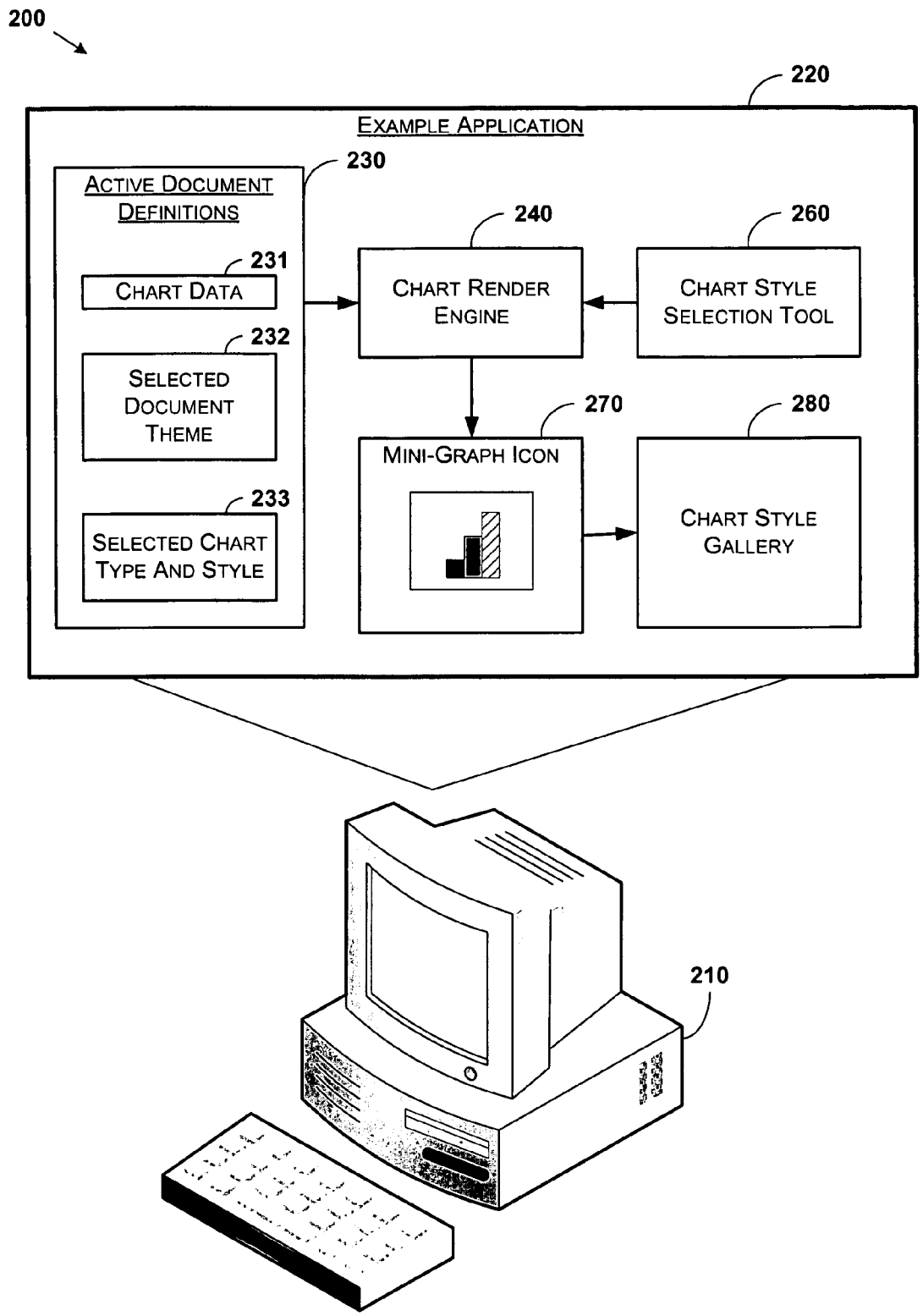

FIGS. 2A and 2B illustrate an example system overview for facilitating graphical rendering of charts and mini-graphs using a common render engine in an application program according to at least some aspects of the present disclosure. System 200 represents a modular overview of a few aspects of computing device 210, where computing device 210 may be arranged in accordance with computing device 100 from FIG. 1. System 200 may be integrated as a combination of software and hardware elements, an operating system or any combination thereof. Hardware, databases, software, applications, and/or programs referenced herein may be integrated as a single element or include various elements in communication with one another. Software and/or hardware elements are depicted herein for explanatory purposes only and not for limiting the configuration to multiple elements or a single element performing several functions unless specifically specified herein.

As depicted in FIGS. 2A and 2B, system 200 includes computing device 210 with a graphics capable application 220. Graphics capable application 224 may be any appropriate application for generating, maintaining, implementing and/or manipulating a graphical chart. For example, graphics capable application 220 may include "MICROSOFT VISIO", "MICROSOFT WORD", "MICROSOFT EXCEL", and/or "MICROSOFT POWERPOINT" from the MICROSOFT CORPORATION located in Redmond, Wash.

Graphics capable application 220 accesses an active document 230, which may be provided from a database or data storage means such as document storage 201. Each active document includes a set of document definitions including chart data 231, a selected document theme 232, and a selected chart type and style 233. Chart data 231 can be entered by a user, retrieved from previously entered data, or retrieved from a database. The selected document theme may be a default theme that is inherited from a default template, a user selected theme, or a customized theme (e.g., a user defined theme or a custom theme retrieved from a common repository). A render engine 240 is utilized to process the chart data 231 and other active documents definitions (e.g., 232 and 233) to generate a graphical representation for the chart in the document 250.

A chart style selection tool 260 is available in graphics capable application 220 to permit selection of a chart style within the currently selected theme. Chart style selection tool 260 evaluates the current active document definitions 230 and interacts with chart render engine 240 to generate a mini graph icon 270 for styles that are available in the currently selected theme. The mini-graph icons 270 can be presented to the user in a gallery view so that the iconic representations can be used for selecting the style for the graph. It is important to note that the same chart render engine 240 that is used for generating the chart in the active document can be used to generate the iconic representations for the chart style selection tool 260.

While there may only be one chart style gallery in the graphics capable application 220, the gallery can be populated with any number of chart icons. For example, the user may select to change a document theme, where chart style gallery can then be updated to display an iconic representation of the new set of chart styles based on the newly selected document theme. Chart style settings may include specifications for the formatting of elements, such as every possible graphical and textual element, both visible and hidden from view.

As stated previously, chart layout settings and/or style settings can be pre-defined or customized. In one example implementation, layout and/or style settings are custom-defined by a user to specify certain standard company or governmental layouts and/or styles. In example another implementation, the user may use custom-defined styles as a way to capture their artistic flair. Chart layout settings and/or style settings can optionally include display order preferences to indicate the order they should be displayed in the user interface. As a few non-limiting examples, the order preferences could indicate alphabetical order, location (client vs. server), predefined vs. custom, date/time order, priority order, index number order, and/or whether the element should be hidden or visible. Other ordering and visibility preferences could also be used.

Figure 3:
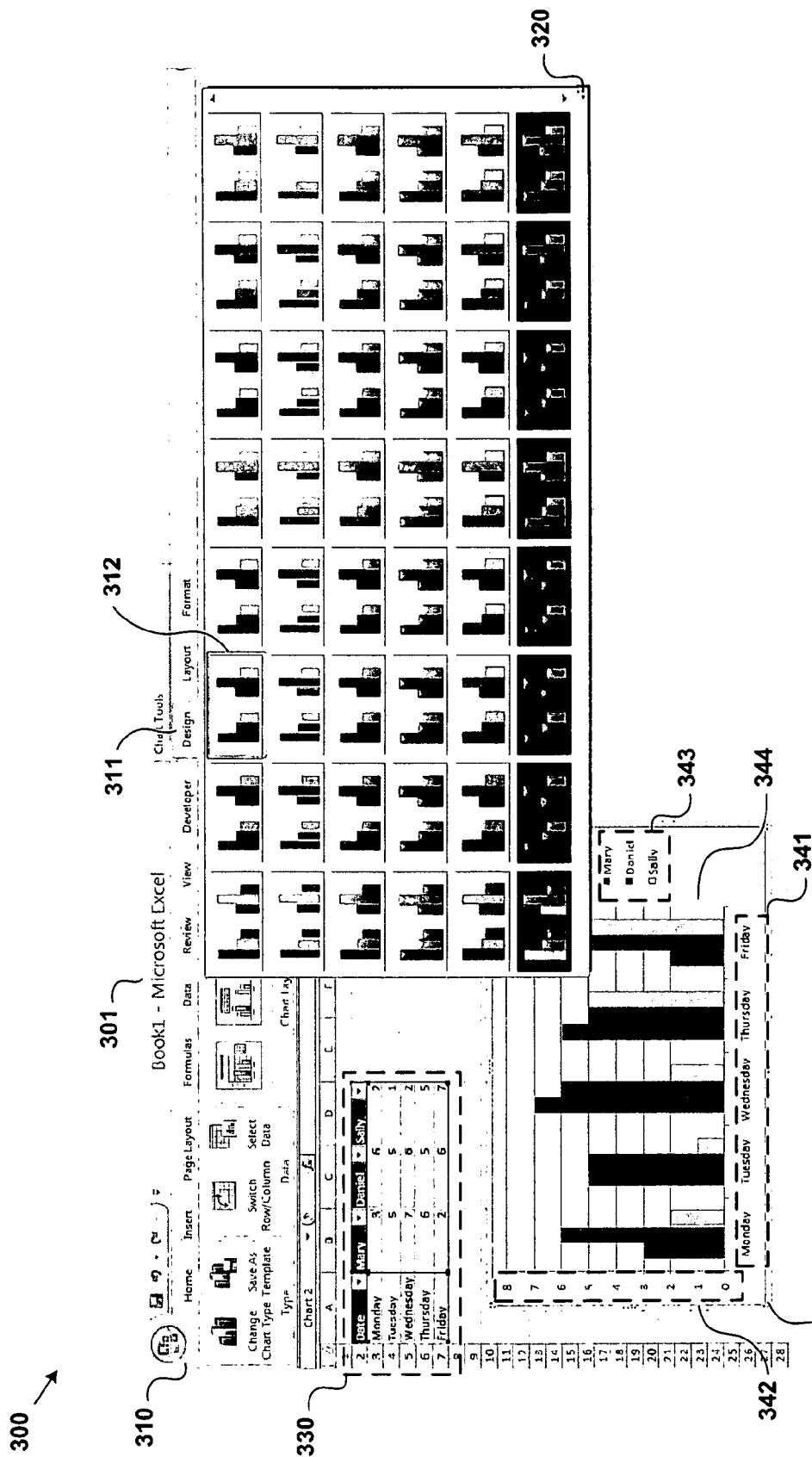
FIG. 3 is a graphical illustration for the operation of an example style selection tool for bar graph chart styles, arranged according to at least some aspects of the present disclosure.

FIG. 3 is a graphical illustration 300 for the operation of an example style selection tool for bar graph chart styles, arranged according to at least some aspects of the present disclosure. Graphical illustration 300 includes an application program 301 such as a spreadsheet program that includes a menu toolbar 310. Menu toolbar 310 permits user selection of a chart style 312 from a pull-down menu 311 that presents a gallery view 320 of available styles for the currently selected theme. Chart data 330 is graphically presented as a bar graph 340, which includes a set of horizontal axis labels 341, a set of vertical axis labels 342, a legend 343, and a set of graph lines 343. After the initial graph type is selected by the user as a bar graph, the chart data is used to render the graph in the appropriate format. Activation of the style selection tool by the pull-down menu 311 results in the dynamic generation of the mini-graph icons represented in gallery view 320.

Figure 4:
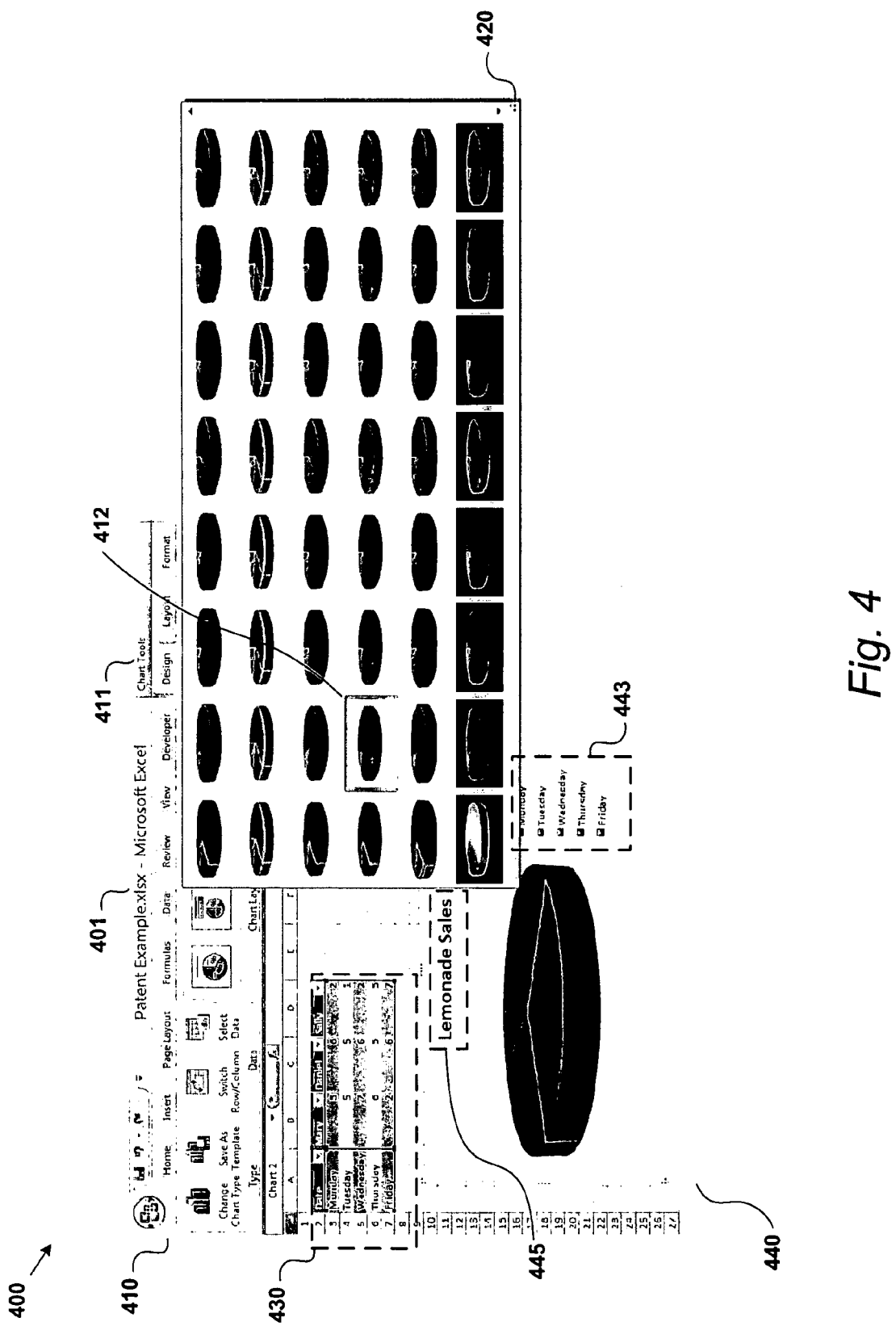
FIG. 4 is a graphical illustration for the operation of an example style selection tool for pie chart styles, arranged according to at least some aspects of the present disclosure.

FIG. 4 is a graphical illustration 400 for the operation of an example style selection tool for pie chart styles, arranged according to at least some aspects of the present disclosure. Graphical illustration 400 includes an application program 401 such as a spreadsheet program that includes a menu toolbar 410. Menu toolbar 410 permits user selection of a chart style 412 from a pull-down menu 411 that presents a gallery view 420 of available styles for the currently selected theme. Chart data 430 is graphically presented as a pie chart 440, which includes a legend 343, and a title 445. After the initial graph type is selected by the user as a bar graph, the chart data is used to render the graph in the appropriate format. Activation of the style selection tool by the pull-down menu 311 results in the dynamic generation of the mini-graph icons represented in gallery view 320.

When the iconic representations created such as for the graphical illustrations of FIGS. 3 and 4, not all of the graphical elements of the selected chart need be rendered. Instead, a subset of the chart elements can be selected for rendering so that the iconic representation is visually appealing and easily conveys a discernable style. The chart is then altered by scaling them down to an iconic representation in a miniaturized graph form factor. A sample data set is then retrieved for the chart icon generation, where the retrieved sample data is specifically selected for the chart type so that the features of the chart are visually distinguishable in iconic form.

Each "mini-graph" chart is in essence a "full-sized" chart that is scaled down to the size of an icon with a few formatting and layout changes for improved visual distinction. The mini-graph has all of the same characteristics as a chart that is inserted into a document since the mini-graph is generated by passing data through the same rendering mechanisms employed for user charts. Also, since the charts can be based on real data, they have a visual likeness to the desired chart type that can ultimately be selected by a user.

The iconic representations used by the mini-graphs are made up of a few chart elements. In one example, the chart elements that are used for mini-graphs include: chart area (e.g., background for the chart), plot area (e.g., data area for the chart), data points and series (e.g., the data that is displayed on the chart), chart title (e.g., a box that is the color of the font used for text in the title region), axes, walls and floor (for 3D charts). Additional elements can be shown as needed for the chart layout gallery view. For instance, when an icon represents the addition of gridlines and data labels these elements are shown on the icon in the gallery view.

In one example, the legends, labels, and graph lines of the chart are stripped off such as illustrated by chart 330 and gallery view 320 in FIG. 3. In another example, the title and legend are stripped off of the chart such as illustrated by chart 430 and gallery view 420 in FIG. 4. Other arrangements are also contemplated where the subset of the chart elements that are selected depend upon the chart type and the desired visual effect on the iconic representations.

A single data set can be used for generating each iconic representation. However, different portions of the data can be used for different chart types. For instance, pie charts can be based on a single series of data, while XY scatter charts may require a minimum of two series of data. The selection of the data employed for icon generation requires that the system determine the chart type employed for the icon and then select the portion of the data that will create a visually appealing icon.

Figure 5:
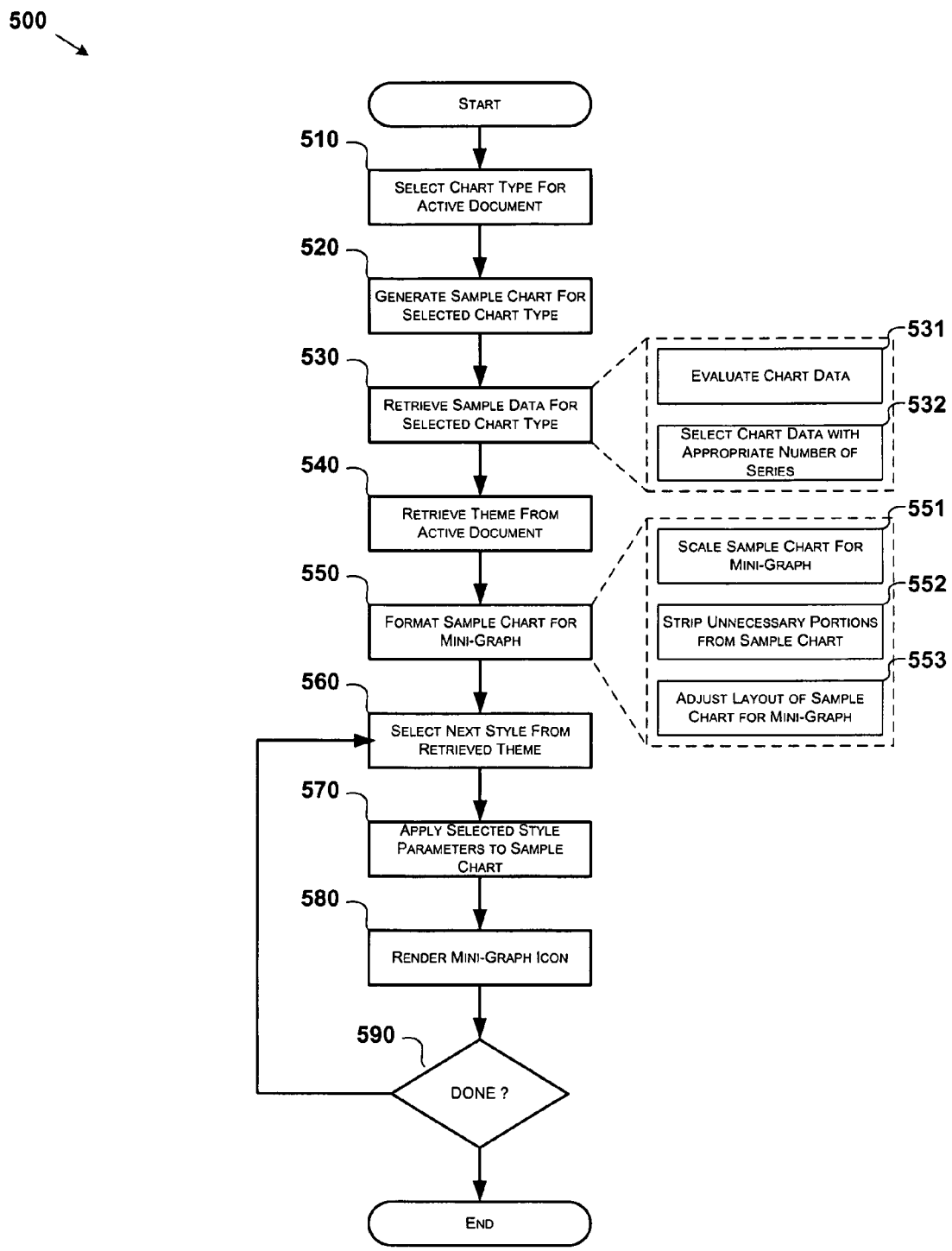
FIG. 5 illustrates a flow chart for an example system that is arranged to dynamically generate mini-graphs in accordance with at least some aspects of the present disclosure.

FIG. 5 illustrates a flow chart 500 for an example system that is arranged to dynamically generate mini-graphs in accordance with at least some aspects of the present disclosure. Flow chart 500 includes processing blocks 510-590, where processing begins at block 510.

At block 510 a chart type is selected for the active document. The selection can be provided by user initiated selection, default selection, or retrieval of a selection from a previously configured chart. Proceeding to block 520, a sample chart is generated for the selected chart type. The sample chart can be generated by selecting a chart template of the same type as the selected chart type, and storing the chart template in memory. Since the sample chart is stored in memory, it does not need to be viewed by the user. Continuing at block 530, sample data is retrieved for the selected chart type. At block 540, the theme for the active document is retrieved such as from a parameter that is stored for the current document. The sample chart is then formatted at block 550 such that the sample chart is resized and processed appropriately to generate an iconic sized representation of the sample chart.

Each theme can include one or more styles that are either predefined or custom defined such as by a user defined style. Beginning at block 560, the next style for the retrieved theme is selected for rendering. At block 570, parameters for the selected style are applied to the sample chart. The stylized and formatted sample graph is then is rendered at block 580 as a mini-graph icon. Decision block 590 returns to block 560 to process additional styles when necessary. Otherwise, decision block 590 concludes the processing from blocks 560 through 580.

Block 530 can optionally be broken into multiple blocks such as illustrated by blocks 531 and 532. At block 531, the chart type for the currently selected chart in the active document is evaluated. At block 532, the chart data is selected based on the evaluation of the chart type, where the chart data is selected so that an appropriate number of series are utilized for improved visual appearance for the iconic representation.

Block 550 can optionally be broken into multiple blocks such as illustrated by blocks 551, 552 and 553. At block 551, the sample chart is scaled to an iconic sized representation that is suitable for a mini-graph. At block 552, unnecessary or undesired portions of the sample chart are stripped off (e.g., labels on axis, legends, etc.). At block 553, the layout for the sample chart is adjusted so that the margins, plot area, and background areas are suitable for the iconic sized mini-graph.

The above described technical features are employed to create a facsimile of a graph and scale down the graph to a smaller form factor suitable for iconic representation as a mini-graph icon. At render time, the chart area can be scaled to an exact icon size, the plot area can be increased in size to better show the data points and series, and the axes are mapped to the plot area. For 3 dimensional charts, the walls and floor of the graphs can be e scaled up to match the size of the plot area during rendering. As each mini-graph icon is rendered, the mini-graphs can be used in several locations in the application program's user interface (UI). For example, the mini-graph icons can be shown in the Chart Template gallery in the Insert Chart and the Change Chart Type dialogs. The mini-graph icons can also be used in the Chart Styles gallery and the Chart Layout gallery.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-readable storage medium having computer-executable instructions for dynamically generating mini-graphs by causing a computer to perform steps comprising:
    identifying a theme associated with a document that includes chart data and a graphical chart associated with the chart data that is rendered by a render engine;
    identifying a chart type associated with the graphical chart;
    generating a sample chart for the selected chart type;
    retrieving sample data for the selected chart type;
    formatting the sample chart for an iconic representation;
    applying a style associated with the identified theme to the iconic representation to generate a mini-graph icon; and
    rendering the mini-graph icon with the same render engine as that of the graphical chart, wherein the mini-graph icon is operable to be selected by a user via selection of the iconic representation.

2. The computer-readable storage medium of claim 1, wherein identifying the theme associated with the document comprises retrieving one of a default theme assigned to the document, a previously selected theme assigned to the document, or a user selected theme associated with the document.

3. The computer-readable storage medium of claim 1, wherein the theme corresponds to one of a set of themes, wherein each theme from the set of themes corresponds to either a pre-selected theme or a customized theme.

4. The computer-readable storage medium of claim 1, wherein the theme is designated as a parameter associated with the document that is stored as either data, meta-data, or as part of an XML structure.

5. The computer-readable storage medium of claim 1, wherein the chart type associated with the graphical chart corresponds to a parameter associated with the document that is stored as either data, meta-data or as part of an XML structure.

6. The computer-readable storage medium of claim 1, wherein generating the sample chart for the selected chart type corresponds to selecting a chart template associated with the selected chart type, and storing the chart template in memory.

7. The computer-readable storage medium of claim 1, wherein retrieving sample data for the selected chart type comprises determining an appropriate number of series for the selected chart type.

8. The computer-readable storage medium of claim 7, wherein retrieving sample data for the selected chart type further comprises selecting sample data for the appropriate number of series.

9. The computer-readable storage medium of claim 7, wherein retrieving sample data for the selected chart type further comprises identifying a number of series associated with the chart data, and adjusting the appropriate number of series for the selected chart type based on the number of series associated with the chart data.

10. The computer-readable storage medium of claim 1, wherein formatting the sample chart for the iconic representation comprises scaling the sample chart to a miniaturized graph form factor.

11. The computer-readable storage medium of claim 1, wherein formatting the sample chart for the iconic representation comprises stripping unnecessary portions of the sample chart.

12. The computer-readable storage medium of claim 11, each unnecessary portion of the sample chart comprises one of a title, a legend, an axis label or a grid line.

13. The computer-readable storage medium of claim 1, wherein formatting the sample chart for the iconic representation comprises adjusting a layout associated with the sample chart.

14. The computer-readable storage medium of claim 13, wherein adjusting the layout associated with the sample chart comprises one of: adjusting a margin, adjusting a plot area, or adjusting a background area such that the adjusted layout is suitable for an iconic sized mini-graph.

15. The computer-readable storage medium of claim 1, wherein the chart type corresponds to one of a column chart, a bar graph, a line chart, a pie chart, an XY scatter chart, an area chart, a surface chart, a 2D chart, or a 3D chart.

16. A method for dynamically generating a style gallery for a toolbar in a graphical application, the method comprising the steps of:
   identifying a theme associated with a document that includes chart data and a graphical chart associated with the chart data that is rendered by a render engine;
   identifying a chart type associated with the graphical chart;
   generating a sample chart for the selected chart type;
   retrieving sample data for the selected chart type;
   formatting the sample chart for an iconic representation;
   applying a style associated with the identified theme to the iconic representation to generate a mini-graph icon;
   rendering the mini-graph icon with the same render engine as that of the graphical chart, wherein the mini-graph icon is operable to be selected by a user via selection of the iconic representation; and
   displaying the rendered mini-graph icon in a gallery view associated with the toolbar.

17. The method of claim 16, wherein generating the sample chart for the selected chart type corresponds to selecting a chart template associated with the selected chart type, and storing the chart template in memory.

18. The method of claim 16, wherein retrieving sample data for the selected chart type comprises evaluating the chart data to identify a number of series associated with the chart data, selecting an appropriate number of series for retrieving the sample data based on the number of series associated with the chart data and the chart type.

19. The computer-readable storage medium of claim 1, wherein formatting the sample chart for the iconic representation comprises scaling the sample chart to a miniaturized graph form factor, stripping unnecessary portions of the sample chart, and adjusting a layout associated with the sample chart.

20. A system for dynamically generating a style gallery for a style selection tool in a graphical application, the system comprising:
   a means for identifying a theme associated with a document that includes chart data and a graphical chart associated with the chart data that is rendered by a render engine;
   a means for identifying a chart type associated with the graphical chart;
   a means for generating a sample chart for the selected chart type;
   a means for retrieving sample data for the selected chart type;
   a means for formatting the sample chart for an iconic representation;
   a means for applying a style associated with the identified theme to the iconic representation to generate a mini-graph icon;
   a means for rendering the mini-graph icon with the same render engine as that of the graphical chart, wherein the mini-graph icon is operable to be selected by a user via selection of the iconic representation; and
   a means for displaying the rendered mini-graph icon in a gallery view associated with the style selection tool.

* * * * *